United States Patent [19]

Agustin et al.

[11] Patent Number: 5,560,199
[45] Date of Patent: Oct. 1, 1996

[54] MALFUNCTION MONITORING APPARATUS AND METHOD FOR SECONDARY AIR SUPPLY SYSTEM OF INTERNAL COMBUSTION ENGINE

[75] Inventors: Rogelio B. Agustin, Katsuta; Toshio Ishii, Mito; Yuichi Kashimura, Katsuta, all of Japan

[73] Assignees: Hitachi, Ltd.; Hitachi Automotive Engineering Co., Ltd., both of Japan

[21] Appl. No.: 354,007

[22] Filed: Dec. 5, 1994

[30] Foreign Application Priority Data

Dec. 14, 1993 [JP] Japan .................................. 5-313699

[51] Int. Cl.$^6$ ................................................. F01N 3/22
[52] U.S. Cl. ............................. 60/274; 60/277; 60/289
[58] Field of Search ............................. 60/277, 274, 289, 60/290

[56] References Cited

U.S. PATENT DOCUMENTS

| | | | |
|---|---|---|---|
| 5,060,474 | 10/1991 | Aramaki | 60/277 |
| 5,119,631 | 6/1992 | Kayanuma et al. | 60/274 |
| 5,140,810 | 8/1992 | Kuroda | 60/277 |
| 5,333,446 | 8/1994 | Itoh | 60/274 |
| 5,381,658 | 1/1995 | Meguro | 60/277 |
| 5,400,591 | 3/1995 | Aramaki | 60/277 |
| 5,406,788 | 4/1995 | Dambach et al. | 60/307 |

FOREIGN PATENT DOCUMENTS

| | | |
|---|---|---|
| 61-58935 | 3/1986 | Japan . |
| 3-286165 | 12/1991 | Japan . |
| 4-1444 | 1/1992 | Japan . |

OTHER PUBLICATIONS

Patent Abstract of Japan, Japanese Patent Document No. 5-179936, dated 5 Nov. 1993.
European Search Report dated Oct. 13, 1995.

Primary Examiner—Douglas Hart
Attorney, Agent, or Firm—Evenson, McKeown, Edwards & Lenahan P.L.L.C.

[57] ABSTRACT

A malfunction monitoring apparatus for a secondary air supply system of an internal combustion engine includes an air flow sensor for measuring the flow rate of an air flowing into an intake air path of the engine, a secondary air introducing path disposed in the intake air path on the downstream side of a measuring position of the air flow rate for taking in a part of the air through the intake air path as a secondary air, a secondary air supply device for supplying the secondary air to an exhaust gas path, and a control unit. The apparatus may further include a pressure sensor for detecting the internal pressure of an intake manifold. The control unit determines a secondary air flow rate from a difference between a first air flow rate measured by the air flow sensor when the secondary air is not being supplied from the secondary air introducing path to the exhaust gas path and a second air flow rate measured by the air flow sensor when the secondary air is being supplied, or a difference between an intake air flow rate of the engine determined on the basis of the internal pressure of the intake manifold detected by the pressure sensor and an air flow rate measured by the air flow sensor when the secondary air is being supplied. In the case where the determined secondary air flow rate is out of a predetermined allowable range, the secondary air supply device is judged as being abnormal.

35 Claims, 9 Drawing Sheets

FIG. IA
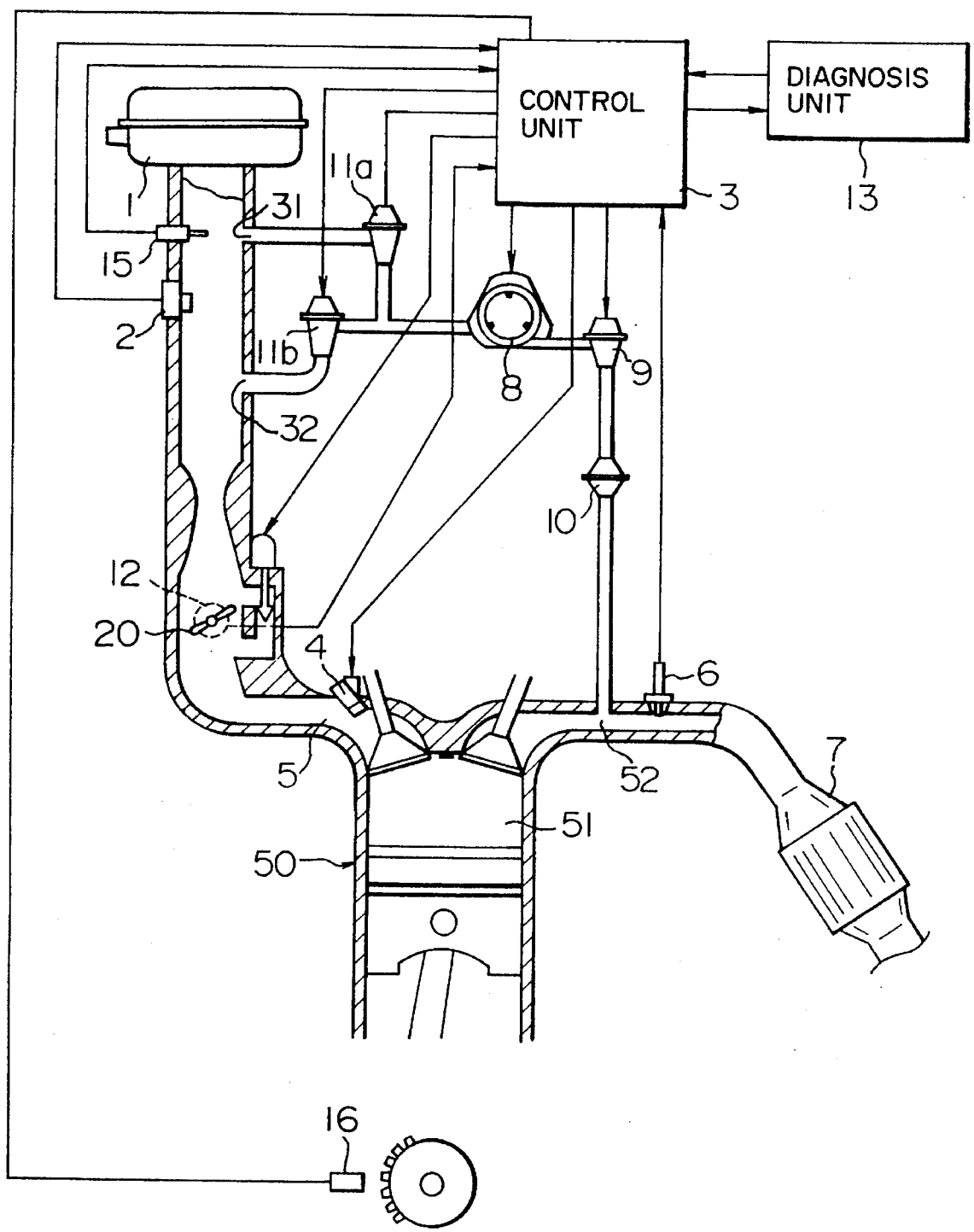

MALFUNCTION MONITORING APPARATUS AND METHOD FOR SECONDARY AIR SUPPLY SYSTEM OF INTERNAL COMBUSTION ENGINE

BACKGROUND OF THE INVENTION

The present invention relates to a malfunction monitoring system for a secondary air supply system of an internal combustion engine, and more particularly to a malfunction monitoring system for a secondary air supply system in which a secondary air is supplied or delivered from an intake system to an exhaust system, for example, in the case where the rise of the temperature of a catalyst or catalytic converter in a low temperature state is to be promoted in the internal combustion engine or in the case where an unburned gas in the exhaust system is to be burned again in the exhaust system.

In a technique of purifying hydrocarbon HCl, carbon monoxide CO and nitrogen oxide $NO_x$ in an exhaust gas by use of a three-way catalyst provided in an exhaust system of an internal combustion engine, it is general that an oxygen concentration sensor is disposed in the exhaust system on the upstream side of the three-way catalyst and a control of feeding back a signal representing the concentration of oxygen in the exhaust gas to an internal combustion engine control unit is performed in order to control an air-fuel ratio into a target value which is in the vicinity of a stoichiometric air-fuel ratio providing the most efficient purifying ability of the three-way catalyst. The purifying ability of the three-way catalyst is deteriorated in the case where the internal temperature of the catalyst is low. Therefore, a secondary air supply system is known in which a part of an air flowing through an intake system is supplied as a secondary air to an exhaust system to oxidize HC and CO in an exhaust gas so that the temperature of a three-way catalyst is raised by the generated heat of reaction of oxidation.

The term "secondary air" used in the present specification and claims is a technical term frequently used in the relevant field of art. In contrast with a "primary air" or an intake air which passes through a throttle valve and then flows into a cylinder of an engine, the term "secondary air" means an air supplied directly to an exhaust system without passing through a combustion chamber of the engine.

"On-Board Diagnostic Phase II" which is regulations proposed by the Air Resources Board of the State of California, USA imposes an obligation to install a malfunction monitoring apparatus for a secondary air supply system on a vehicle. The flow rate of a secondary air supplied to the exhaust system of an engine provided with an exhaust emission control system and the amounts of components such as nitrogen oxide, hydrocarbon and carbon monoxide in an exhaust gas substantially have a corresponding relationship therebetween. Namely, as the flow rate of the secondary air is higher, the amount of nitrogen oxide or carbon monoxide exhibits a tendency to decrease. Accordingly, when the flow rate of the secondary air is reduced, the amount of harmful exhaust gas component increases. The relationship between the secondary air flow rate and the amount of a component such as nitrogen oxide or carbon monoxide in an exhaust gas can be determined by measurement. The "On-Board Diagnostic Phase II" requires a malfunction monitoring apparatus to judge a secondary air supply system as being faulty in the case where the measured secondary air flow rate of the secondary air supply system decreases down to a secondary air flow rate value which corresponds to 1.5 times as high as a regulated value for exhaust gas emission amount.

One example of a monitoring apparatus for a secondary air supply system has been disclosed by JP-A-4-1444 which is the laid-open publication of a Japanese patent application filed by Toyota Motor Co., Ltd. on Apr. 18, 1990. The disclosed monitoring apparatus monitors the output of an oxygen concentration sensor when a secondary air is supplied to an exhaust pipe. The diagnosis is made in such a manner that the output of the oxygen sensor shows a lean condition (or a condition in which the amount of oxygen is small) if the secondary air supply system is normal and a rich condition (or a condition in which the amount of oxygen is large) if the secondary air supply system is abnormal. In this monitoring apparatus, the judgement as to whether the secondary air flow rate is high or low is only made indirectly on the basis of the output of the oxygen sensor with the actual secondary air flow rate being not directly measured. In this monitoring apparatus, there may be the case where the oxygen sensor output does not necessarily indicate a true malfunction.

The monitoring or diagnosis of a malfunction of the secondary air supply system with no direct measurement of the secondary air flow rate involves the following problems. In the case where another operating parameter of the engine indirectly representing the secondary air flow rate is to be measured as a substitution for the secondary air flow rate, it is necessary to calibrate a relationship between a true secondary air flow rate and the value of that operating parameter to be measured. When taking the aged deterioration of the engine, it may be necessary to periodically make such a calibration during a useful life of the engine. Also, in the case where a phased change in regulated exhaust gas emission amount from TLEV (Transitional Low Emission Vehicle) to LEV (Low Emission Vehicle) is made as in the State of California, the change of a threshold level for a judgement parameter of a malfunction judging device is required for each phased change and the change of a sensor for measuring the judgement parameter and/or the change of engine specification may be required according to circumstances. Such changes will bring about the rise of an engine development cost.

A secondary air supply system provided with a dedicated air flow sensor for directly measuring the flow rate of a secondary air has been disclosed by JP-A-61-58935 which is the laid-open publication of a Japanese patent application filed by Matsuda Co., Ltd. on Aug. 30, 1984. In the disclosed system, the provision of the dedicated secondary air flow sensor in an engine requires that an input gate for the output of the sensor and an A/D converter for the sensor output should additionally be provided in an engine control unit. Also, in the case where the dedicated air flow sensor is attached in a secondary air path which is proximate to the engine body, a device for countering noises will be needed. The above brings about a problem that an engine manufacturing cost is increased and a problem that the engine control unit becomes large in size and complicated.

An engine deterioration judging apparatus provided with a secondary air supply system has been disclosed by JP-A-3-286165 which is the laid-open publication of a Japanese patent application filed by Matsuda Co., Ltd. on Mar. 30, 1990. In the disclosed apparatus, the negative pressure or vacuum of an intake pipe and the flow rate of an intake air are measured and the inferiority of seal of an intake system of an engine is detected on the basis of a judgement level and a relationship between the measured values of the intake manifold vacuum and the intake air flow rate while the judgement level is changed in accordance with a control signal of the secondary air supply system. This publication has no disclosure of the measurement of the flow rate of a secondary air and the judgement as to the malfunction of the secondary air supply system.

SUMMARY OF THE INVENTION

According to the present invention, a low-cost, small-size and accurate malfunction monitoring apparatus for a secondary air supply system is provided without newly adding a sensor or the like to the existing engine control system. According to the present invention, the value of an actual secondary air flow rate is directly measured. Therefore, it is possible to easily cope with the change of a regulated value for exhaust gas emission amount. Also, the calibration of a relationship between the substitutional parameter and the secondary air flow rate becomes unnecessary.

In the present time, the most of engines have a fuel flow rate control system based on electronic control and any engine provided with such a system is provided with an intake air amount measuring device. According to the present invention, the measurement of a secondary air flow rate is possible by an intake air amount measuring device of an internal combustion engine. Also, in many engines, an intake pipe pressure sensor for measuring the internal pressure of an intake pipe is provided as a part of the fuel flow rate control system or an emission control system. According to the present invention, the measurement of a secondary air flow rate can also be made by the existing intake air amount measuring device and the existing intake pipe pressure sensor which are already provided in the engine.

A malfunction monitoring apparatus for a secondary air supply system according to one embodiment of the present invention comprises an air flow rate detecting device for measuring the flow rate of an air flowing into an intake air path of an internal combustion engine, a secondary air introducing path disposed in the intake air path on the downstream side of a measuring position of the air flow rate for taking in a part of the air through the intake air path as a secondary air, a secondary air supply device for supplying the secondary air to an exhaust gas path, and a control unit. The air flow rate detecting device measures a first air flow rate when the secondary air is not being supplied from the secondary air introducing path into the exhaust gas path and a second air flow rate when the secondary air is being supplied from the secondary air introducing path into the exhaust gas path. The control unit determines a secondary air flow rate from a difference between the first and second air flow rates. In the case where the determined secondary air flow rate is out of a predetermined allowable range, the secondary air supply device is judged as being abnormal.

A malfunction monitoring apparatus for secondary air supply system according to another embodiment of the present invention comprises an air flow rate detecting device for measuring the flow rate of an air flowing into an intake air path of an internal combustion engine, a secondary air introducing path disposed in the intake air path on the downstream side of a measuring point of the air flow rate for taking in a part of the air through the intake air path as a secondary air, a secondary air supply device for supplying the secondary air to an exhaust Gas path, a pressure detecting device for detecting the internal pressure of an intake manifold, and a control unit. The control unit determines an intake air flow rate of an internal combustion engine on the basis of the detected internal pressure value of the intake manifold, and determines a secondary air flow rate from a difference between an air flow rate measured by the air flow rate measuring device when the secondary air is being supplied from the secondary air introducing path into the exhaust Gas path and the determined intake air flow rate. In the case where the determined secondary air flow rate is out of a predetermined allowable range, the secondary air supply device is judged as being abnormal.

BRIEF DESCRIPTION OF THE DRAWINGS

FIG. 1A is a block diagram of an internal combustion engine provided with a monitoring apparatus for a secondary air supply system according to an embodiment of the present invention;

DESCRIPTION OF THE PREFERRED EMBODIMENTS

Figure 1B:
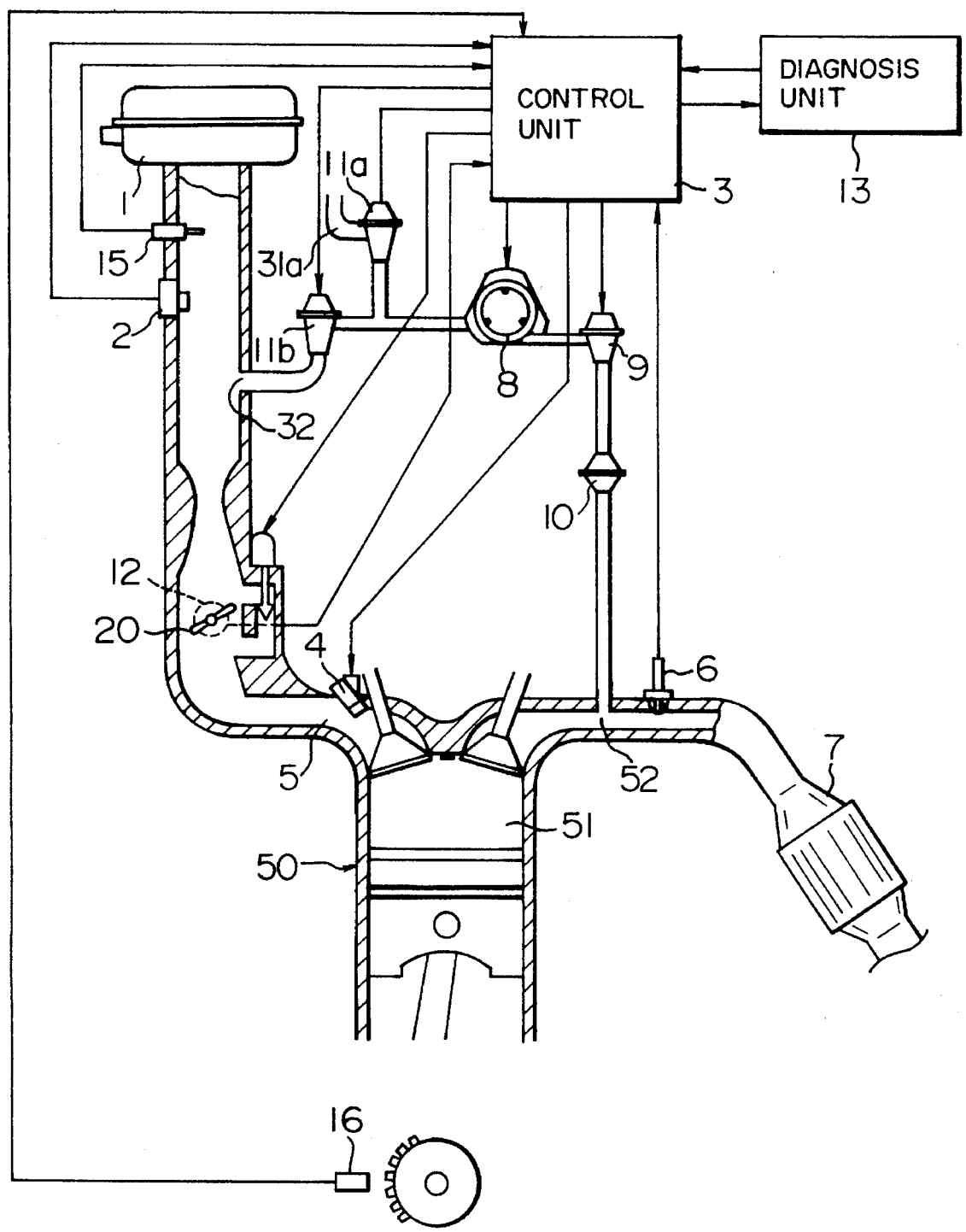
FIG. 1B is a block diagram of an internal combustion engine provided with a monitoring apparatus for a secondary air supply system according to another embodiment of the present invention.

Embodiments of the present invention will now be explained in reference to the accompanying drawings. In the drawings used for explaining the embodiments, a component having the same function is designated by the same reference numeral. Therefore, the repeated explanation of such a component will be omitted.

FIG. 1A is a basic block diagram schematically showing the whole of a monitoring apparatus for a secondary air supply system of an internal combustion engine according to a first embodiment of the present invention. In the system of the present embodiment, an exhaust system from an air cleaner 1 to an internal combustion engine 50 is provided with a throttle valve 20 for adjusting the amount of an air to be taken in the engine 50 and a throttle sensor 12 for detecting the opening angle of the throttle valve. An air flow sensor 2 for detecting the flow rate of an intake air filtered by the air cleaner 1 and a temperature sensor 15 for detecting the temperature of the intake air are provided on the upstream side of the throttle sensor 12.

An engine control unit 3 calculates a proper fuel injection amount on the basis of measurement parameters including the measurement value of the air flow sensor 2, the output signal of an engine speed sensor 16, and so forth. The control unit 30 outputs a fuel injection signal to an injector 4 in accordance with the result of calculation so that a suitable amount of fuel is injected from the injector 4. The thus obtained mixture of fuel and intake air passes through an intake manifold 5 and is then taken in a combustion chamber 51 of the internal combustion engine. After the compression, combustion and expansion strokes of the engine 50, an exhaust gas is discharged to an exhaust manifold 52. In order to detect the concentration of oxygen in the exhaust gas, an oxygen concentration sensor 6 is disposed in or immediately after the exhaust manifold 52. The correction of a fuel injection amount is made in accordance with an output signal of the oxygen concentration sensor 6, so as to control the air/fuel ratio of the intake mixture at a desired value. Further, a catalytic converter 7 for purifying the exhaust gas is disposed on the downstream side of the oxygen concentration sensor 6.

A secondary air is supplied to an exhaust system in order to oxidize unburned gas components (HC and CO) in the exhaust gas. The secondary air is taken in from an inlet 31 provided between the air cleaner 1 and the air flow sensor 2. The secondary air is thereafter compressed by an air pump 8. The compressed secondary air is passed through a secondary air control valve 9 and a check valve or contraflow preventing valve 10 and is then blown into the exhaust manifold 52 on the upstream side of the oxygen concentration sensor 6. Also, an inlet 32 for secondary air is provided on the downstream side of the air flow sensor 2. Further, switch valves 11a and 11b are respectively disposed between the inlet 31 and the air pump 8 and between the inlet 32 and the air pump 8. With the switching operation of the switch valves 11a and 11b, the inlet 31 on the upstream side of the air flow sensor 2 or the inlet 32 on the downstream side thereof can properly be selected as a secondary air inlet. A malfunction diagnosis unit 13 receives an output signal from the control unit 3 to make the diagnosis of a malfunction of the secondary air supply system.

That inlet 31 of the two secondary air inlets 31 and 32 provided in the intake pipe, which is positioned on the upstream side of the air flow sensor 2, is used in the case where the malfunction diagnosis is not made but the injection of an secondary air is made for the purpose of rising the temperature of the catalytic converter 7. The two secondary air inlet 32 provided on the upstream side of the air flow sensor 2 is used in the case where the secondary air is temporarily taken in when the malfunction diagnosis is to be made.

In another embodiment shown in FIG. 1B, a secondary air inlet 31a opened to the atmosphere is provided in lieu of the secondary air inlet 31 of the upstream side in the embodiment shown in FIG. 1A. Since the operation of the embodiment shown in FIG. 1B is fundamentally the same as that of the embodiment shown in FIG. 1A, the explanation of the operation will be represented by the explanation made in conjunction with the case of the system shown in FIG. 1A.

The air pump 8 is electrically driven by a battery as a power supply (not shown). However, there may also be used an air pump which is mechanically driven from an output shaft of an engine through a drive belt. The control unit 3 and the diagnosis unit 13 include a general microcomputer(s) including a CPU, a memory and an I/O controller, wherein an engine control program and a malfunction diagnosis program are stored in the memory. The control unit 3 and the diagnosis unit 13 can be realized by separate microcomputers or a single microcomputer.

The secondary air injection position may be between the oxygen concentration sensor 6 and an entrance to the catalytic converter 7.

The operation of the secondary air supply system of the embodiment shown in FIG. 1A (or FIG. 1B) will now be explained. The supply of a secondary air to the exhaust system for promoting the activation of the catalytic converter is generally carried out after cold start or in the case where the temperature of the catalytic converter 7 is low. For example, in the case where the water temperature of the engine is below a predetermined value, a secondary air is injected to the upstream side of the catalytic converter 7 only during a predetermined period of time (e.g., several minutes) after engine start. Engine oil temperature, vehicle speed and so forth besides conditions inclusive of engine speed, water temperature and time may be used as parameters to determine the secondary air supply instant of time.

In principle, the supply of the secondary air is not carried out at the time of normal engine operation other than cold start and at the time of idling after warming up with the exception of a malfunction diagnosis period. But, in a system in which the activation of the catalytic converter 7 is necessary even except at the time of cold start, the secondary air may be injected in a specified engine operating condition.

A malfunction diagnosis operation is performed when a preset or fixed engine operating condition is assumed. The engine operating condition when such a malfunction diagnosis operation is performed is properly determined by a parameter such as the engine speed of the internal combustion engine, the negative pressure or vacuum of the engine or the running speed of the vehicle. In a malfunction diagnosis period, the air pump 8 is temporarily driven for measurement of the flow rate of a secondary air so that the secondary air is supplied to the exhaust system.

At the time of normal engine operation having no need of a secondary air, the control unit 3 causes no driving of the air pump 8 and closes the secondary air control valve 9. At the same time, the control unit 3 closes at least one of the switch valves 11a and 11b to prevent an intake air from bypassing from the inlet 31 to the inlet 32 through the switch valves 11a and 11b. Thus, the air flow sensor 2 can measure an accurate intake air flow rate.

In the case where a large amount of unburned gas is discharged from the internal combustion engine as at the time of start of the engine or the like, a secondary air is supplied into the exhaust manifold 52 to cause the reaction of oxidation of the unburned gas by the catalytic converter 7.

In the case where a secondary air is supplied but when the diagnosis of a malfunction is not made, the secondary air is taken in from the secondary air inlet 31 on the upstream side of the air flow sensor 2 (or the inlet 31a). Namely, in a state in which the switch valve 11a is opened and the switch valve 11b is closed, the control unit 3 drives the air pump 8 and opens the secondary air control valve 9. At this time, dust or the like in the air used in the secondary air supply system for the purpose of secondary air supply is removed by the air cleaner 1. Thereby, it is possible to prevent the promotion of deterioration of the catalytic converter 7, etc. and a malfunction which may be caused by the secondary air. By thus taking in the secondary air from the inlet 31 on the upstream side of the air flow sensor 2, the amount of an air passed through the air flow sensor 2 or measured by the air flow sensor 2 is all taken in the internal combustion engine 50.

On the other hand, when the malfunction diagnosis is to be made, the control unit 3 drives the air pump 8 with the switch valve 11a closed and the switch valve 11b opened so that a secondary air is taken in from the inlet 32 on the downstream side of the air flow sensor 2. In this case, an output value Qb of the air flow sensor 2 is equal to the sum of an air amount Qa taken in the cylinder of the internal combustion engine 50 and an air amount Qs used for the supply of secondary air. The air amount Qs used for the supply of secondary air is determined by subtracting the intake air amount Qa taken in the engine from the output value Qb of the air flow sensor 2. See equation (1) which will be mentioned later on.

Next, a malfunction diagnosis process according to the malfunction monitoring apparatus for the secondary air supply system of the internal combustion engine in the embodiment shown in FIGS. 1A and 1B will be explained in reference to one example of a control flow chart shown in FIG. 2.

First or in step 201, whether or not an operating region is an operating region to be subjected to the diagnosis of a malfunction or secondary air is judged on the basis of, for example, engine speed, load, water temperature or the like. The value of the load can be determined by the output of the throttle sensor 12. In the case where the operating region to be subjected to the diagnosis is assumed, the judgement is made as to whether or not the diagnosis is completed (step 202). When the diagnosis is not completed, the judgement is made as to whether or not an intake air amount Qa measured by the air flow sensor 2 (or an air amount supplied to the internal combustion engine 50) in a state in which no secondary air is supplied has been determined (step 203). In the case where Qa has been determined, the flow proceeds to step 205. On the other hand, in the case where Qa has not been determined, Qa as the intake air amount is determined in a state in which no secondary air is taken in and the determined Qa is stored into the memory (step 204). In step 206, the air pump 8 is driven to supply a secondary air from the inlet 32 on the downstream side of the air flow sensor 2 to the exhaust manifold 52. In step 207, the judgement is made as to whether or not a change in operating condition is caused in a predetermined time. For example, a change in engine speed is checked. If there is a change in operating condition, the processing is cancelled without making the malfunction diagnosis. If there is no change in operating condition, the flow goes to step 205.

In step 205, the judgement is made as to whether or not an intake air amount Qb measured by the air flow sensor 2 when the secondary air is supplied from the inlet 32 on the downstream side of the air flow sensor 2 has been determined. In the case where Qb has been determined, the flow goes to step 212. In the case where Qb has not been determined, the flow goes to step 208 and further to step 209. In step 208, the judgement is made as to whether or not the output of the air flow sensor (AFS) 2 is stable. In the case where the output of the air flow sensor 2 is stable, the flow goes to step 209 in which a secondary air is supplied with the switch valve 11b opened and the air pump 8 driven and the value Qb of an output of the air flow sensor 2 at that time is stored into the memory. The output value Qa of the air flow sensor 2 indicates an air flow rate taken in the cylinder of the engine and the output value Qb thereof indicates the sum of an air flow rate taken in the cylinder of the engine and a secondary air flow rate. Accordingly, the secondary air flow rate Qs is determined by the following equation (1):

$$Qb = Qa + Qs$$

that is, $$Qs = Qb - Qa. \quad (1)$$

As mentioned above, the judgement as to the stability of the output of the air flow sensor 2 is made in step 208. Namely, the judgement is made of whether or not the variation of the output of the air flow sensor 2 in a predetermined time is in a predetermined tolerance. In the case where the output of the air flow sensor 2 is not stable, no diagnosis is made. On the other hand, in the case where the variation of the output of the air flow sensor 2 is in the tolerance, that is, in the case where the output Qb of the air flow sensor 2 can be judged as indicating the sum of the air amount Qa taken in the internal combustion engine 50 and the air amount Qs used as the secondary air, the intake air amount Qb at that time is measured by the air flow sensor 2 (step 209). Qb is stored into the memory as the sum of the air amount Qa taken in the engine 50 and the air amount Qs used as the secondary air. In step 210, the supply of the secondary air is stopped. When the supply of the secondary air is stopped, the air amount indicated by the air flow sensor 2 turns from the sum of the air amount Qa taken in the engine 50 and the air amount Qs used as the secondary air to only the air amount Qa taken in the engine 50. Namely, since Qs=0 in equation (1), there results in Qb=Qa. Next or in step 211, the judgement is made as to whether or not there is a change in operating condition. The presence/absence of the change in operating condition is judged in accordance with whether or not a change in engine speed or output of the throttle sensor 12 in a predetermined time is in a predetermined tolerance. In the case where there is a change in operating condition, the malfunction diagnosis is finished. In the case where there is no change in operating condition, the flow goes to step 212.

In step 212, the judgement is made as to whether or not the output of the air flow sensor 2 is stable. This judgement can be made in a manner similar to that in step 208. In the case where the sensor output is not stable, the diagnosis process is finished. In the case where the sensor output is stable, the flow goes to step 213 in which an intake air flow rate Qc when no secondary air is introduced is measured by the air flow sensor 2 again. The air flow rate Qc measured in step 213 and the air flow rate Qa measured in step 204 indicate the same value in substance if the measuring condition is the same. In actual, however, since there is a time difference between at the time of measurement of Qa and at the time of measurement of Qc and the measurement of Qb in step 209 is made in that time difference, there may be the case where the values of Qa and Qc differ from each other. Therefore, the average of the two values Qa and Qc can be used to determine a more accurate secondary air flow rate.

In step 214, a secondary air flow rate Qs is calculated from the air flow rates Qa, Qb and Qc detected by the air flow sensor 2 in accordance with the following equation (2):

$$Qs = Qb - (Qa + Qc)/2. \quad (2)$$

In the case where the variation of the air flow rate Qa is negligible, the secondary air flow rate Qs may be determined in accordance with equation (1) with the measurement of Qc in step 213 being not carried out.

Equation (2) is satisfied in the case where a constant operating condition is assumed until the measurement of Qa to Qc is completed. Therefore, in the shown example of control, the diagnosis of secondary air is forcibly cancelled or finished in the case where a change in operating condition is caused during a period of time from the measurement of Qa to the completion of the measurement of Qc. In contrast with this, there can be employed a method in which the measurement of Qa to Qc is made over. The change in operating condition can be detected or discriminated by monitoring a variation in output of the throttle sensor 12 or monitoring the engine speed of the internal combustion engine 50.

In step 215, the diagnosis unit 13 compares the obtained secondary air flow rate Qs and a secondary air flow rate to be fundamentally supplied. In the case where Qa is out of a predetermined judgement level (or threshold value) range, the diagnosis unit 13 judges the secondary air supply system as being abnormal or faulty. The details of step 215 will be explained later on referring to FIG. 8.

There may be the case where the output of the air flow sensor 2 does not indicate the intake air amount of the internal combustion engine during malfunction diagnosis of the secondary air supply system. During malfunction diagnosis of the secondary air supply system, Qa is taken as the intake air amount for determination of a fuel injection amount.

Figure 2:
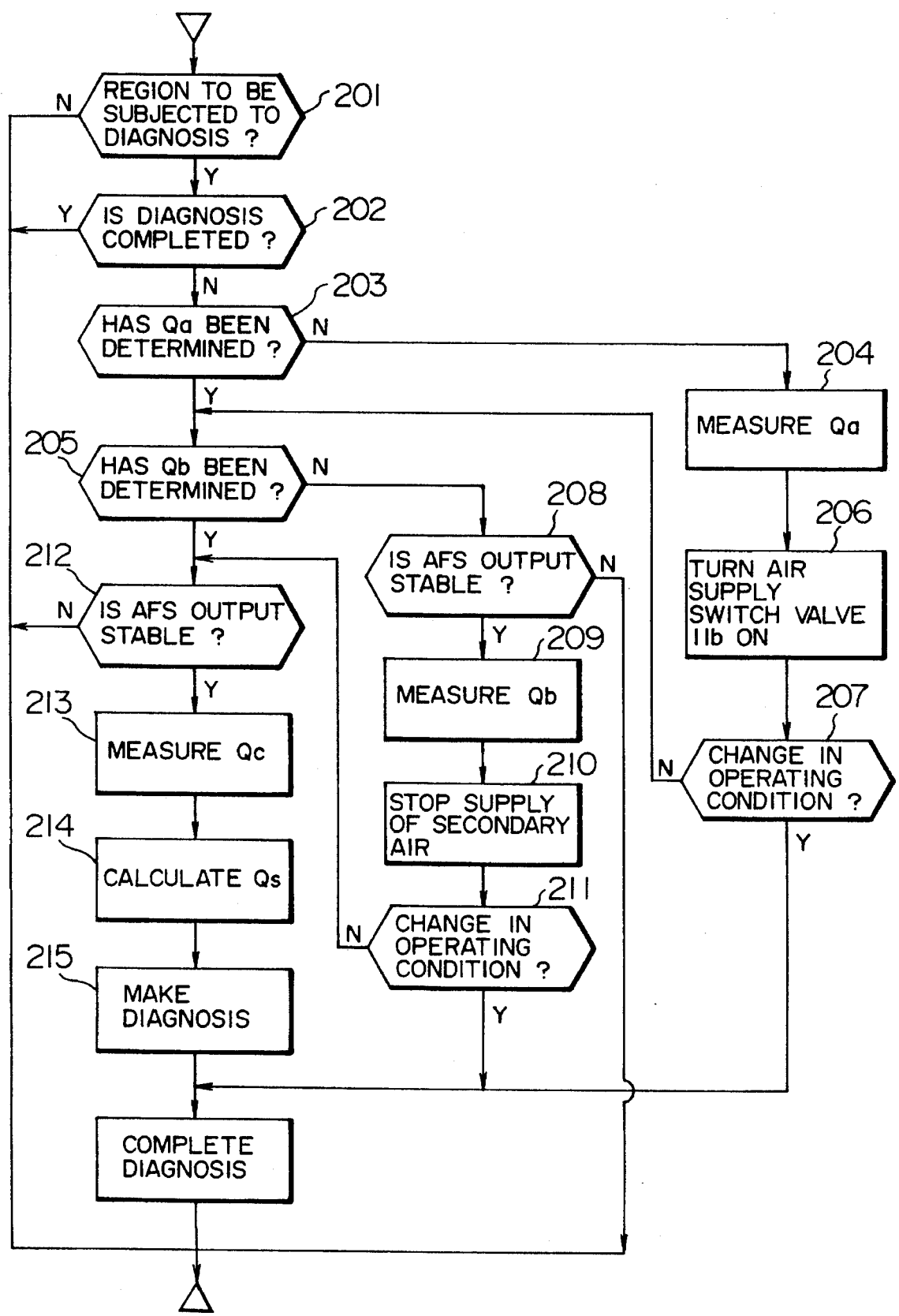
FIG. 2 is a flow chart of the operation of malfunction diagnosis in the system shown in FIG. 1A or 1B.
Figure 3:
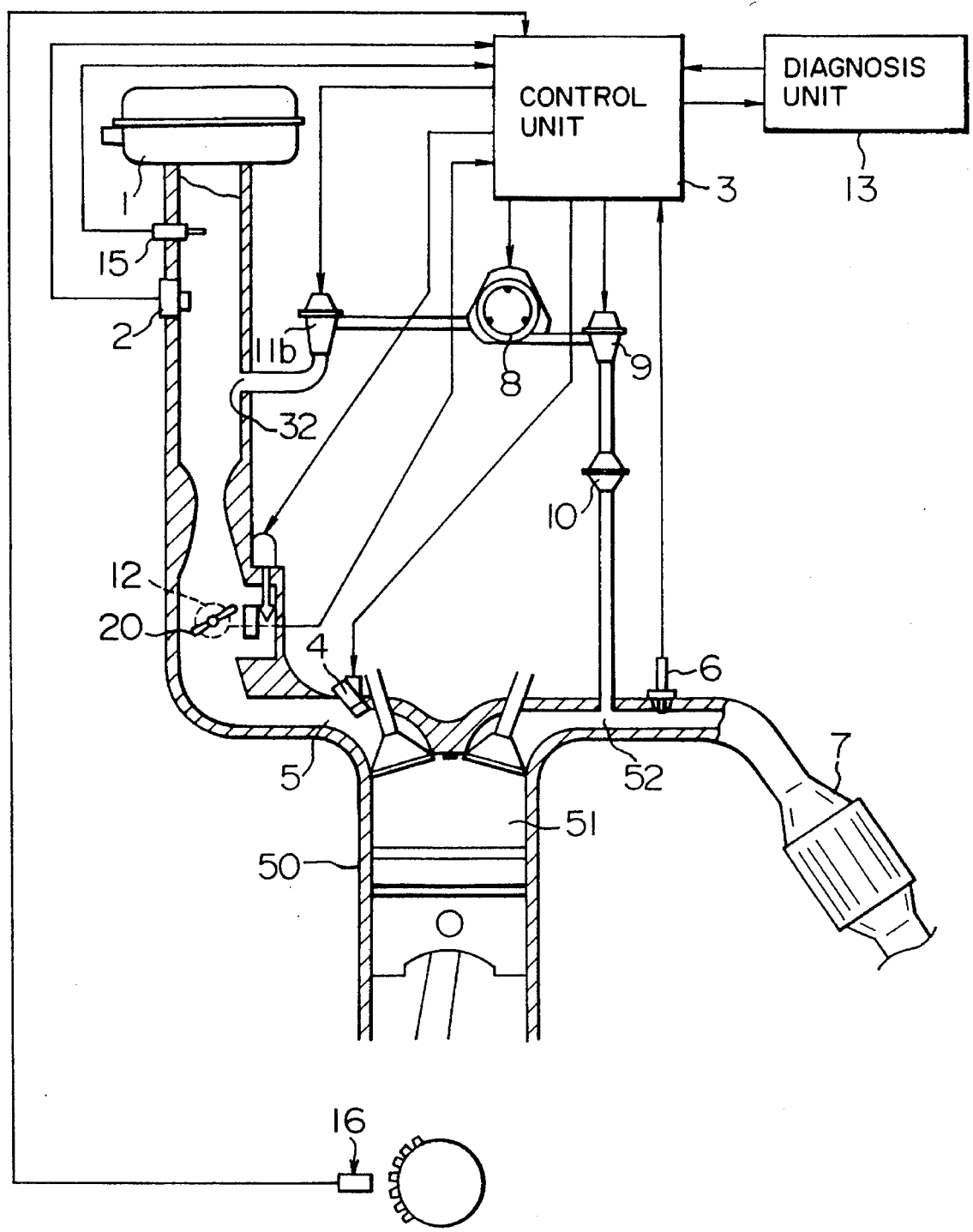
FIG. 3 is a block diagram of an internal combustion engine provided with a monitoring apparatus for a secondary air supply system according to a further embodiment of the present invention.

FIG. 3 shows a further embodiment of the present invention. In FIG. 3, the same components as those in FIGS. 1A and 1B are designated by the same reference numerals as those used in FIGS. 1A and 1B. The embodiment shown in FIG. 3 is one in which the secondary air inlet 31 of the upstream side and the switch valve 11a are removed from the embodiment shown in FIG. 1A. In the present embodiment, therefore, a secondary air is introduced from a single inlet 32 on the downstream side of an air flow sensor 2. The measurement of an intake air amount Qa is carried out in a state in which a switch valve 11b is closed. A diagnosis process in the present embodiment is basically the same as the flow chart shown in FIG. 2. However, in the case where the secondary air is injected for the purpose of activation of a catalytic converter when the diagnosis of a malfunction is not made, an output of the air flow sensor 2 does not indicates a correct intake air amount of the engine. Accordingly, in the case where a fuel injection amount is to be determined during in a period of time when the secondary air is injected, it is necessary to subtract a value corresponding to a secondary air flow rate from the output value of the air flow sensor 2. This value for correction of the air flow sensor output can be determined by reading a beforehand determined map which is stored in a memory and represents the correspondence of the value of a secondary air amount to an engine speed or throttle opening angle.

Figure 4:
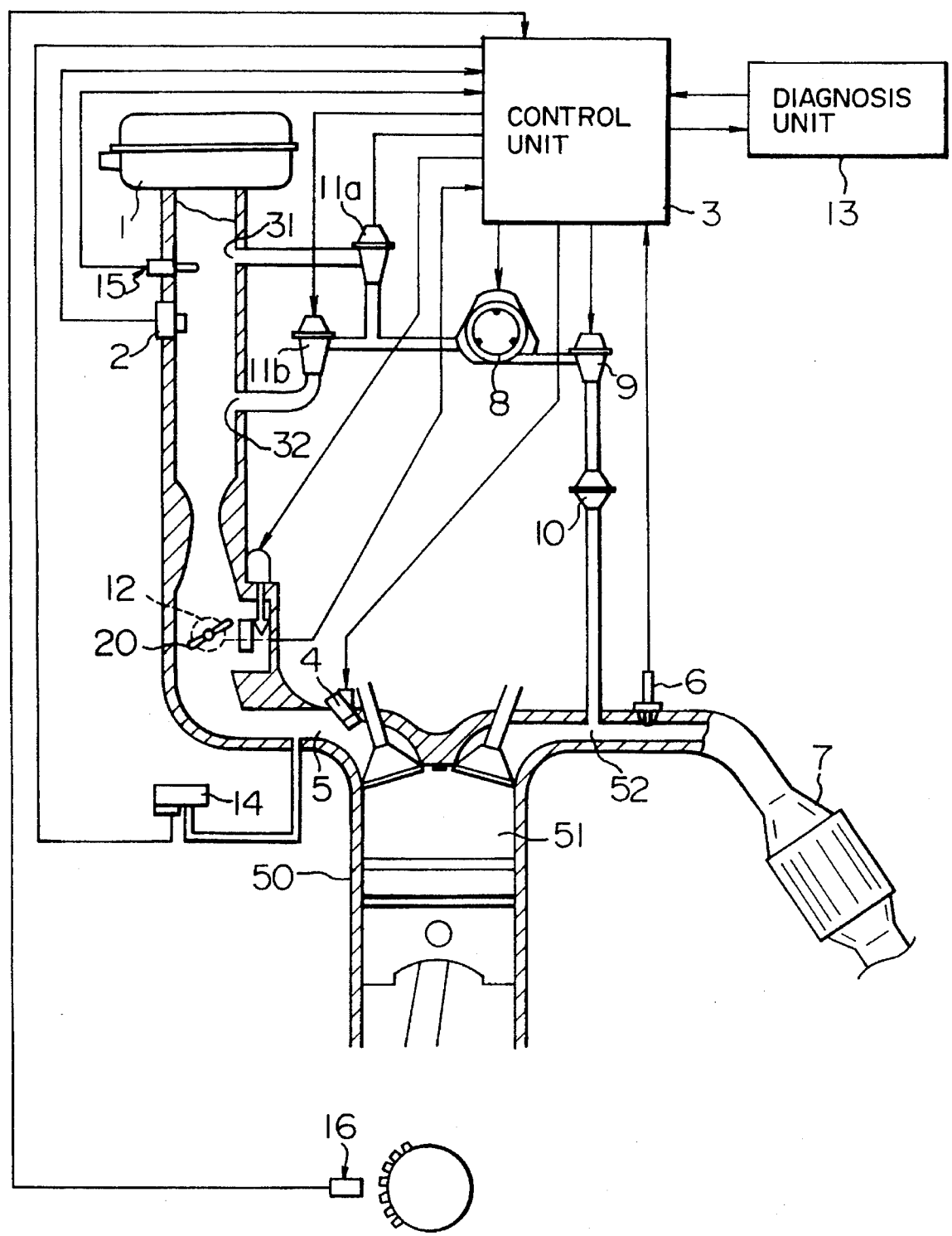
FIG. 4 is a block diagram of an internal combustion engine provided with a monitoring apparatus for a secondary air supply system according to a still further embodiment of the present invention.
Figure 5:
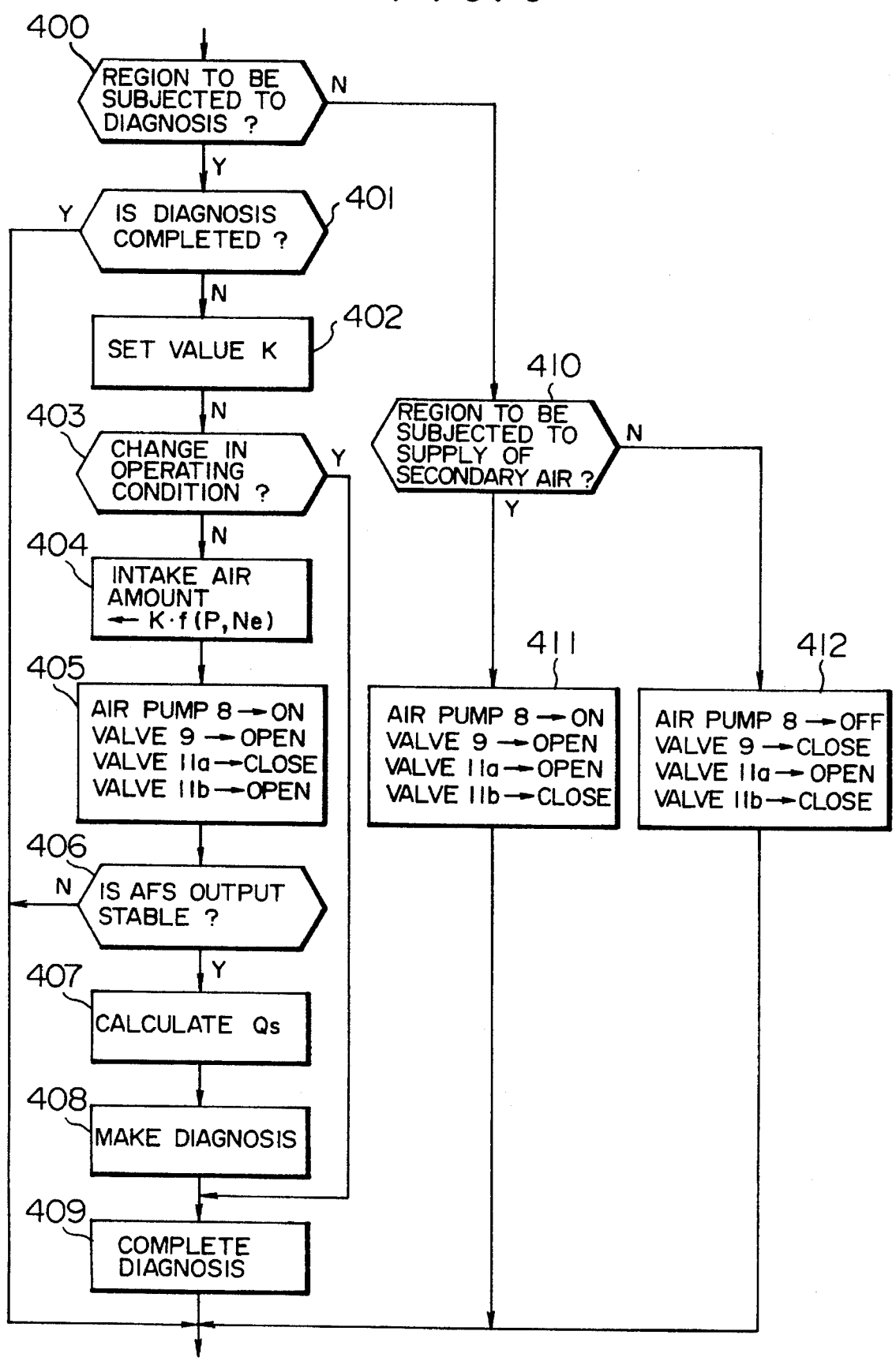
FIG. 5 is a flow chart of the operation of malfunction diagnosis in the system shown in FIG. 4.

FIG. 4 is a systematic diagram schematically showing the whole of a malfunction monitoring apparatus for a secondary air supply system according to a still further embodiment of the present invention. FIG. 5 shows an example of a control flow chart for the system shown in FIG. 4.

The system of the present embodiment shown in FIG. 4 is basically the same as the system shown in FIG. 1A but is different therefrom in that a pressure sensor 14 as a pressure detecting device is added to the system shown in FIG. 1A.

In an internal combustion engine, there may be the case where the diagnosis of a malfunction of an EGR (Exhaust Gas Recirculation) system or evaporative emission control system is made besides the diagnosis of a malfunction of a secondary air supply system. In such a system, the pressure of an intake air in an intake manifold 5 is measured by a pressure sensor or the like. In the present embodiment, the pressure sensor 14 beforehand incorporated in the system for use in another diagnosing or monitoring system is utilized for the diagnosis of a malfunction of the secondary air supply system. Thereby, it is possible to eliminate a labor and cost required for specially mounting a sensor or the like in order to make the diagnosis of a malfunction of the secondary air supply system.

The pressure sensor 14 measures the pressure of the interior (or internal pressure) of the intake manifold 5. In a period of time when the diagnosis of a malfunction of the secondary air supply system is not made, an intake air amount is measured by an air flow sensor 2. On the other hand, in the case where the diagnosis is made, an intake air amount is determined on the basis of the measurement of the internal pressure of the intake manifold 5. A relationship between the internal pressure Pm of the intake manifold 5 and the intake air amount Qpm, in the case where the internal combustion engine 50 is in a normal operating condition, is as follows:

$$Qpm = f(Ne, Pm) \tag{3}$$

where Qpm is the intake air amount, Ne the engine speed, and Pm the internal pressure of the intake manifold.

The intake air amount Qpm is a function of the engine speed Ne of the internal combustion engine and the internal pressure Pm of the intake manifold. In one method of actually determining the intake air amount Qpm, the engine speed Ne and the internal pressure Pm of the intake manifold are used to preliminarily obtain a relational expression representing a relation thereof with the intake air amount Qpm and the substitution of the measured engine speed Ne and the measured internal pressure Pm is made in the relational expression to determine the intake air amount Qpm. In another method of determining Qpm, an intake air amount map with the engine speed values Ne and the internal pressure values Pm of the intake manifold being taken as matrix parameters is experimentally formed and stored in a memory and the intake air amount Qpm is determined referring to the map.

The intake air amount Qpm determined by the engine speed Ne and the internal pressure Pm of the intake manifold is also used to determine a secondary air amount Qs in accordance with the following equation (4):

$$Qs = Qhw - K \cdot Qpm \tag{4}$$

where Qs is the secondary air amount, Qhw the air amount measured by the air flow sensor when the secondary air is supplied, Qpm the intake air amount determined by the engine speed and the internal pressure of the intake manifold, and K a correction factor.

The air amount Qhw obtained by the air flow sensor 2 is a mass flow rate. On the other hand, the air amount Qpm obtained from the internal pressure Pm of the intake manifold and the engine speed Ne is a volume flow rate. Therefore, the correction of Qpm for air density is required for conversion into a correct mass flow rate. Accordingly, an intake air temperature is measured by a temperature sensor 15 to make the correction of the flow rate Qpm for the intake air temperature by multiplying Qpm by the correction factor K.

The value of correction factor K is determined by the temperature of the atmospheric air and the pressure of the atmospheric air. In the present embodiment, the correction factor K is approximately determined by only the temperature. It is of course that the correction factor K may be determined by parameters of both the temperature and the pressure. The value of correction factor K for a temperature value (or an atmospheric pressure value) is beforehand measured by experiments and this relationship in a map form is stored in a memory. When an output of the temperature sensor 15 is given, a control unit 3 reads a corresponding value of correction factor K from the map to use it for determination of an secondary air amount according to equation (4).

In the actual engine, the relationship between the correction factor K and the temperature (or the atmospheric pressure) is generally subjected to a change from the initially obtained relationship due to the aged change of the engine. Accordingly, it is preferable that the value of correction factor K in the map is properly corrected or updated. The correction of the correction factor K is possible by a learning control which will be explained hereinbelow.

During a period of time when a secondary air is not flown, both the air amount Qhw' measured by the air flow sensor 2 and the air amount Qpm obtained from the internal pressure Pm of the intake manifold and the engine speed Ne are based on the measurement of only the air amount taken in the internal combustion engine. Therefore, the air amounts Qhw' and Qpm have a relationship therebetween which is represented by the following equation (5):

$$Qhw' = K \cdot Qpm \tag{5}$$

where K is a correction factor for intake air temperature.

The intake air amount Qhw' measured by the air flow sensor 2 when the secondary air is not flown is periodically compared with K·Qpm. If a difference between Qhw' and K·Qpm is within a predetermined tolerance, the value of correction factor K in the map is used as it is. In the case where the difference is beyond the tolerance, the value of correction factor K in the map is updated so that equation (5) is satisfied.

In the case where a correction for the atmospheric pressure is further introduced into the correction factor K, it is not necessary to separately or newly provide a pressure sensor for measurement of the atmospheric pressure. Namely, the pressure sensor 14 provided in the intake manifold 5 can be used for that purpose. During a period of time when the engine is stopped, the internal pressure of the intake manifold 5 assumes the atmospheric pressure. The atmospheric pressure can be determined in such a manner that the atmospheric pressure is measured immediately before a starter key (not shown) is turned to a starting direction for the cranking of the engine or after the lapse of a predetermined time from the stoppage of the engine by the turn-back of the starter key and the measured atmospheric pressure is stored into a memory.

Next, a malfunction diagnosis process according to the malfunction monitoring apparatus for the secondary air supply system of the internal combustion engine in the embodiment shown in FIG. 4 will be explained in reference to one example of a control flow chart shown in FIG. 5.

First or in step 401, the judgement is made as to whether or not an operating region is an operating region to be subjected to the diagnosis of a malfunction or secondary air. In the case where the operating region to be subjected to the diagnosis is assumed, the flow proceeds to step 401 in which the judgement is made as to whether or not the diagnosis is completed. When the diagnosis is completed, the processing is completed. When the diagnosis is not completed, the value of correction factor K is determined in step 402. In step 403, the judgement is made as to whether or not a change in operating condition is caused. When there is a change in operating condition, the processing is finished without making the diagnosis. On the other hand, when there is no change in operating condition, an intake air amount Qpm in a state in which a secondary air is not flown is determined and a corresponding correction factor K in the map is read to make the correction of Qpm (step 404).

Next or in step 405, the secondary air is supplied. In step 406, the judgement is made as to whether or not the output of the air flow sensor 2 is stable. When the sensor output is not stable, the processing is completed without making the diagnosis. On the other hand, when the output of the air flow sensor 2 is stable, that is, when equation (4) can be judged as being satisfied, a secondary air amount Qs is calculated using equation (4) (step 407).

In step 408, the thus obtained secondary air amount Qs is compared with a secondary air amount to be fundamentally supplied. In the case where Qs is out of a predetermined judgement level (or threshold value) range, the secondary air supply system is judged as being abnormal or faulty, thereby completing the diagnosis (step 409).

In the case where the judgement in step 401 is that the region to be subjected to the diagnosis of secondary air is not assumed, no diagnosis of secondary air is made but a usual control of the presence/absence or ON/OFF of the supply of a secondary air is performed. Namely, in step 410, the judgement is made as to whether or not an operating region is a region to be subjected to the supply of secondary air. In the case where the region to be subjected to the supply of secondary air is assumed, a secondary air is supplied (step 411). In the case where the region to be subjected to the supply of secondary air is not assumed, a bypath of the intake air is closed (step 412). The secondary air may be introduced from the atmosphere in lieu of the inlet 31 of the upstream side.

Figure 6:
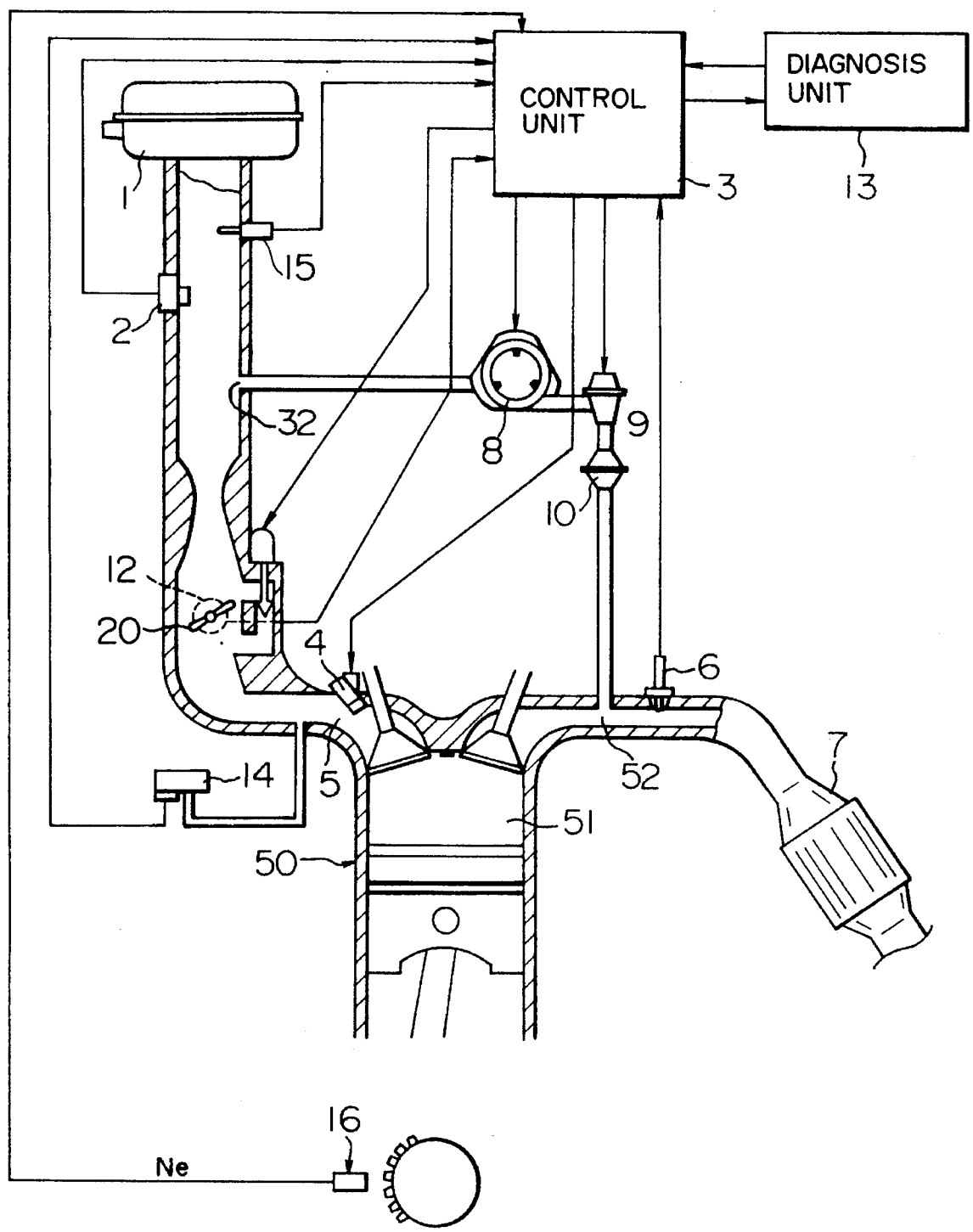
FIG. 6 is a block diagram of an internal combustion engine provided with a monitoring apparatus for a secondary air supply system according to a furthermore embodiment of the present invention.
Figure 7:
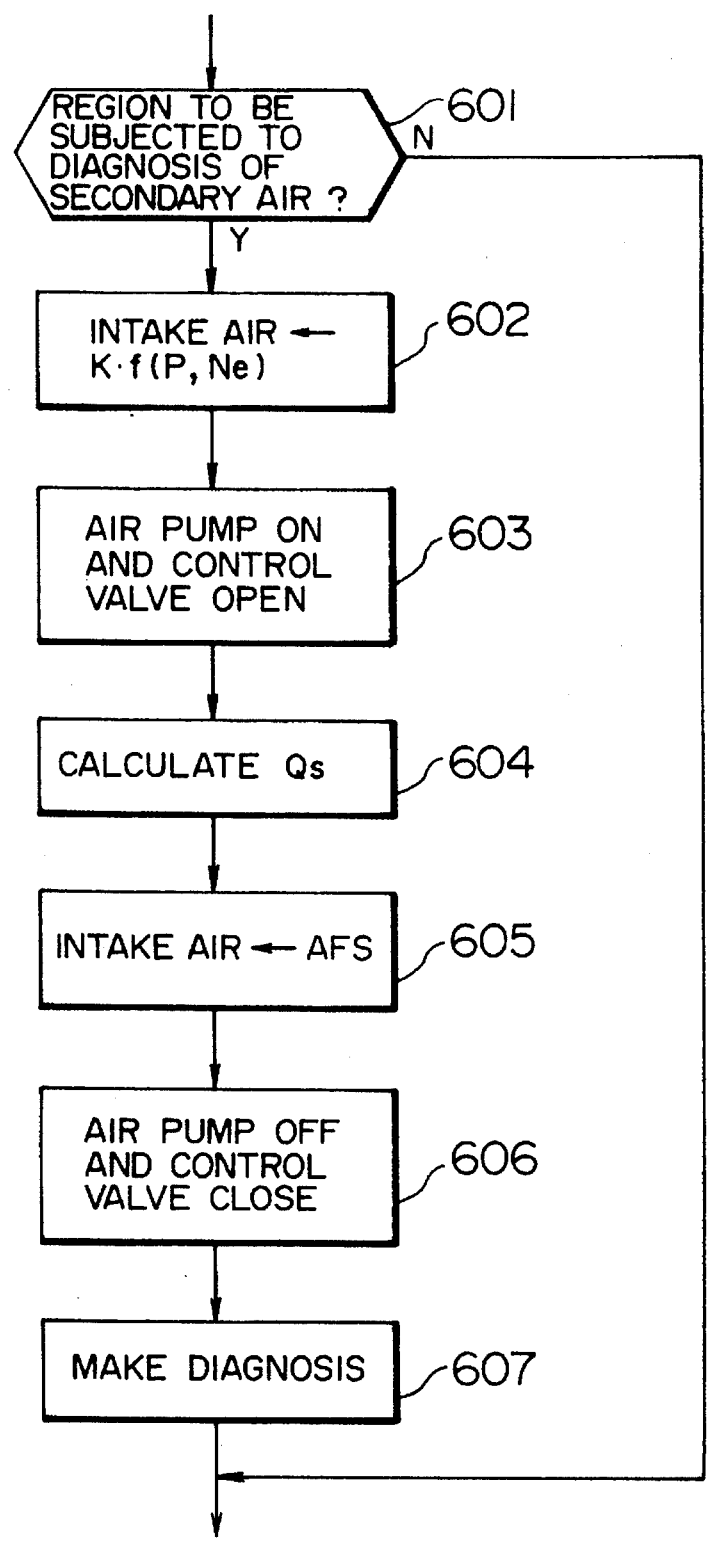
FIG. 7 is a flow chart of the operation of malfunction diagnosis in the system shown in FIG. 6.

FIG. 6 is a systematic diagram schematically showing the whole of a malfunction monitoring apparatus for a secondary air supply system according to a furthermore embodiment of the present invention. FIG. 7 shows an example of a control flow chart for the system shown in FIG. 6.

The system of the present embodiment shown in FIG. 6 is basically the same as the system shown in FIG. 4 but is different therefrom in that the switch valves 11a and 11b are omitted from the system shown in FIG. 4.

In the system of the present embodiment, the judgement is made as to whether or not an operating region is a region to be subjected to the diagnosis of secondary air (step 601).

In the case where the operating region is judged as being the region to be subjected to the diagnosis of secondary air, a control unit 3 determines an intake air flow rate Qpm, in a state in which a secondary air is not supplied, on the basis of the outputs of a pressure sensor 14 and a engine speed sensor 16 (step 602). At this time, in a manner similar to that in the embodiment shown in FIG. 4, the control unit 3 determines a temperature correction factor K on the basis of the output of an intake air temperature sensor 15 to determine an intake air flow rate Qa=K·Qpm corrected by the correction factor K.

In next step 603, an air pump 8 is driven with a control valve 9 being opened at the same time to supply a secondary air to an exhaust system 52. Further in step 604, the output Qb of an air flow sensor 2 is obtained. Since the air flow rate Qb is the sum of the intake air amount Qa=K·Qpm of the engine and a secondary air flow rate Qs, the secondary air flow rate Qs is determined from the following equation (6):

$$Qs = Qb - Qa = Qb - K \cdot Qpm. \tag{6}$$

After the secondary air flow rate Qs has been determined, the air pump 8 is stopped and the control valve 9 is closed, thereby stopping the supply of the secondary air (step 605). In step 606, the intake air amount Qa is determined from the output of the air flow sensor 2. On the basis of the intake air amount Qa determined in step 606, a fuel injection amount is determined.

In step 607, the thus obtained secondary air amount Qs is compared with a reference judgement level(s). In the case where Qs is out of the predetermined judgement level range, the secondary air supply system is judged as being abnormal or faulty, thereby completing the diagnosis.

Figure 8:
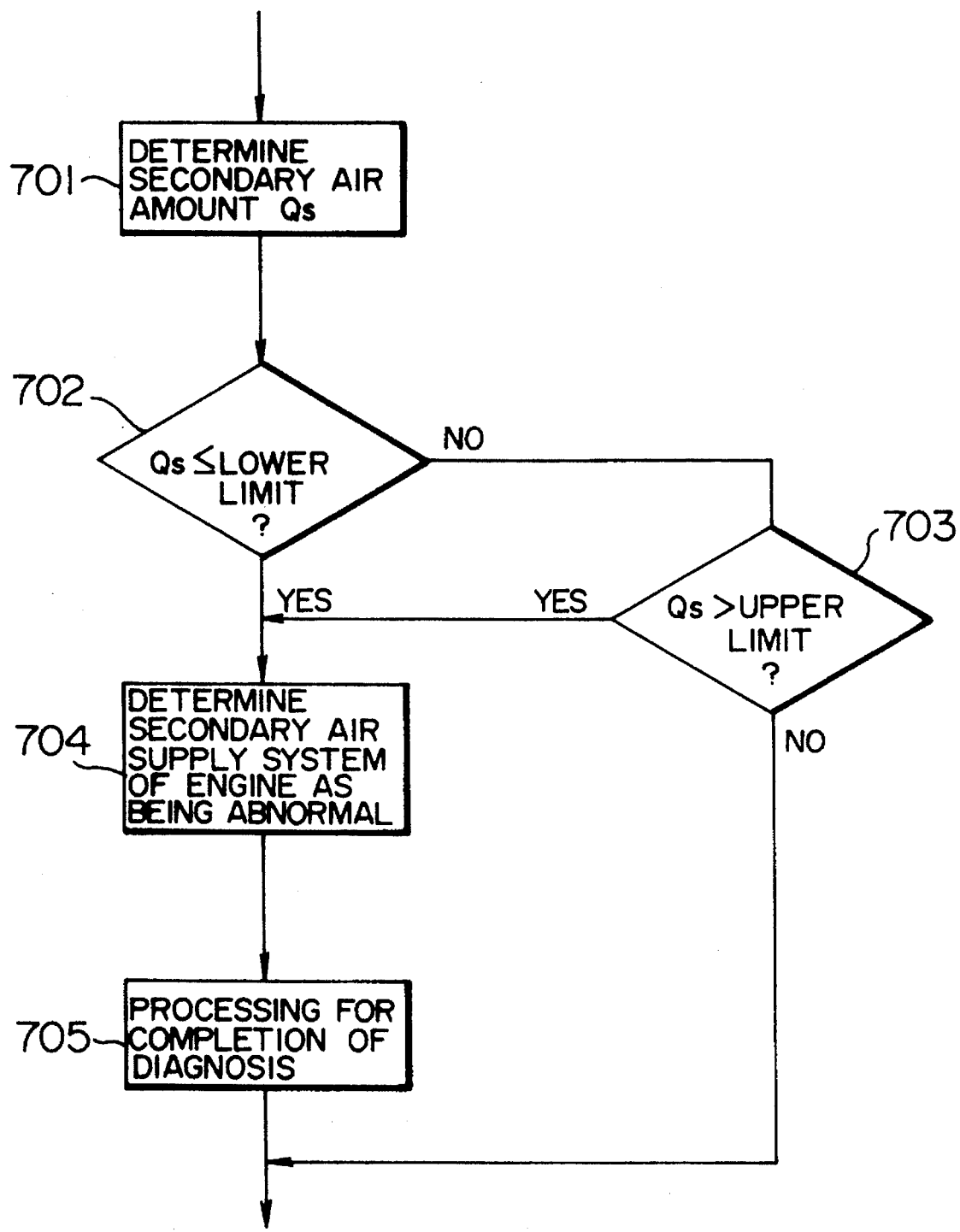
FIG. 8 is a flow chart for making the more detailed explanation of the operation of a diagnosis process step.

FIG. 8 is a flow chart for explaining the operation of the diagnosis process in step 215 of FIG. 2, step 408 of FIG. 5 and step 607 of FIG. 7. In step 701, the diagnosis unit 13 takes in the secondary air amount Qs determined by the control unit 3. In step 702, the diagnosis unit 13 judges whether or not the secondary air amount Qs is not larger than a predetermined lower limit. The lower limit is properly determined, for example, in accordance with a regulated value for exhaust gas component emission amount and is stored in a memory. In the case where the secondary air amount Qs is larger than the lower limit, the judgement is made as to whether or not the secondary air amount Qs is larger than a predetermined upper limit (step 703). The upper limit is also determined beforehand and is stored in the memory. In the case where the secondary air amount Qs is not larger than the lower limit or is larger than the upper limit, the secondary air supply system is judged as being abnormal or faulty (step 704). The upper limit for judgement as to a malfunction is provided because there may be the case where the secondary air supply system involves the leakage of secondary air and such a case should be diagnosed as being abnormal. In the case where there is the leakage of secondary air, there may be a fear that the supply of an excess amount of secondary air or the supply of the secondary air to the exhaust system when the secondary air is not required causes the over-heating of the catalytic converter 7. In the present invention, however, the judgement of abnormality can be made by the comparison of the secondary air amount Qs with only the lower limit.

In step 705, the result of diagnosis as being abnormal, the operating condition at that time, and so forth are stored into the memory. The stored contents can be read in repairing the system afterwards. Also, a processing for the lighting of a warning lamp, the generation of an alarm or the operation of a fail-safe function may be performed in response to the result of diagnosis as being abnormal.

Though the present invention has been explained in detail in conjunction with the specified embodiments, it should be noted that the present invention is not limited to the specified embodiments and various modifications or variations can be made without departing from the scope of the invention described in the appended claims.

For example, the two switch valves used in the embodiment shown in FIG. 1 can be replaced by a three-way valve.

According to the present invention, the measurement of a secondary air flow rate becomes possible without newly adding a sensor or the like. Also, the mere change of diagnosis threshold data suffices to cope with a change in level of an exhaust gas emission amount to be detected. As a result, the number of accurate diagnosis of malfunction of a secondary air supply system becomes possible.

What is claimed is:

1. A malfunction monitoring apparatus for a secondary air supply system in an internal combustion engine, comprising:

an air flow rate detecting device (2) for measuring the flow rate of an air flowing into an intake air path of the engine;

a first secondary-air introducing path (32) disposed in said intake air path on the downstream side of a measuring position of the air flow rate for taking in a part of the air through said intake air path as a secondary air;

a secondary air supply device (8) for supplying the secondary air to an exhaust gas path of the engine;

control means (3) for determining a first air flow rate (Qa) measured by the air low rate detecting device when the secondary air is not being supplied from said first secondary air-introducing path into said exhaust gas path and a second air flow rate (Qb) measured by said air flow rate detecting device when the secondary air is being supplied from said first secondary-air introducing path into said exhaust gas path and determining a secondary air flow rate (Qs) from a difference between said first and second air flow rates; and diagnosis means (13) for judging said secondary air supply device as being abnormal in the case where the determined secondary air flow rate is Out of a predetermined allowable range.

2. A malfunction monitoring apparatus according to claim 1, further comprising a second secondary-air introducing path (31*a*) having an inlet for introducing an air from the atmosphere, and switch valve means (11*a*, 11*b*) for coupling a selected one of said first secondary-air introducing path (32) and said second secondary-air introducing path to said secondary air supply device (8), and wherein said control means (3) includes means for making a control so that said switch valve means couples said second secondary-air introducing path to said secondary air supply device in the case where said secondary air flow rate is not to be determined.

3. A malfunction monitoring apparatus according to claim 1, further comprising a second secondary-air introducing path (31) disposed in said intake air path on the downstream side of said air flow rate detecting device (2) for taking in a part of the air through said intake air path as a secondary air, and switch valve means (11*a*, 11*b*) for coupling a selected one of said first secondary-air introducing path (32) and said second secondary-air introducing path to said secondary air supply device (8), and wherein said control means (3) includes means for making a control so that said switch valve means couples said second secondary-air introducing path to said secondary air supply device in the case where said secondary air flow rate is not to be determined.

4. A malfunction monitoring apparatus according to claim 2, wherein said control means (3) measures said first air flow rate twice before and after a period of time when said second air flow rate (Qb) is measured and determines said secondary air flow rate (Qs) from a difference between an average of both the measurement values (Qa, Qc) for said first air flow rate and said second air flow rate.

5. A malfunction monitoring apparatus according to claim 4, wherein the engine includes sensor means (12, 16) for detecting the value of an operating parameter when the engine is operated, and said control unit (3) further includes means (201) for judging whether or not the operating parameter value detected by said sensor means satisfies a predetermined condition, said control means making the determination of said secondary air flow rate in the case where the operating parameter value satisfies said predetermined condition.

6. A malfunction monitoring apparatus according to claim 5, wherein a catalytic converter (7) for purifying an exhaust gas is disposed in said exhaust gas path and said secondary air supply device (8) supplies the secondary air to the upstream side (52) of an entrance to said catalytic converter.

7. A malfunction monitoring apparatus according to claim 6, wherein said control means (3) controls said secondary air supply means (8) and said switch valve means (11*a*, 11*b*) so that when the operating parameter value does not satisfy said predetermined condition, the secondary air is supplied to said exhaust gas path in the case where the engine is in a specified operating condition.

8. A malfunction monitoring apparatus according to claim 7, wherein said control means (3) further includes means for determining a fuel amount to be supplied to the engine on the basis of the value of said first air flow rate detected by said air flow rate detecting device (2).

9. A malfunction monitoring apparatus according to claim 1, wherein in said diagnosis means (13), said predetermined allowable range is set to be larger than a predetermined value.

10. A malfunction monitoring apparatus according to claim 1, wherein in said diagnosis means (13), said predetermined allowable range is set to be between first and second predetermined values.

11. A malfunction monitoring apparatus for a secondary air supply system in an internal combustion engine, comprising:

an air flow rate detecting device (2) for measuring the flow rate of an air flowing into an intake air path of the engine;

a first secondary-air introducing path (32) disposed in said intake air path on the downstream side of a measuring position of the air flow rate for taking in a part of the air through said intake air path as a secondary air;

a secondary air supply device (8) for supplying the secondary air to an exhaust gas path of the engine;

a pressure detecting device (14) for detecting the internal pressure of an intake manifold of the engine;

control means (3) including means for determining an intake air flow rate (Qpm) of the engine on the basis of the detected value of the internal pressure of said intake manifold and means for determining a secondary air flow rate (Qs) from a difference between the determined intake air flow rate and an air flow rate (Qhw) measured by said air flow rate detecting device when the secondary air is being supplied from said first secondary-air introducing path into said exhaust gas path; and diagnosis means (13) for judging said secondary air supply device as being abnormal in the case where the determined secondary air flow rate is out of a predetermined allowable range.

12. A malfunction monitoring apparatus according to claim 11, further comprising a second secondary-air introducing path (31a) having an inlet for introducing an air from the atmosphere, and switch valve means (11a, 11b) for coupling a selected one of said first secondary-air introducing path (32) and said second secondary-air introducing path to said secondary air supply device (8), and wherein said control means (3) includes means for making a control so that said switch valve means couples said second secondary-air introducing path to said secondary air supply device in the case where said secondary air flow rate is not to be determined.

13. A malfunction monitoring apparatus according to claim 11, further comprising a second secondary-air introducing path (31) disposed in said intake air path on the downstream side of said air flow rate detecting device (2) for taking in a part of the air through said intake air path as a secondary air, and switch valve means (11a, 11b) for coupling a selected one of said first secondary-air introducing path (32) and said second secondary-air introducing path to said secondary air supply device (8), and wherein said control means (3) includes means for making a control so that said switch valve means couples said second secondary-air introducing path to said secondary air supply device in the case where the secondary air flow rate is not to be determined.

14. A malfunction monitoring apparatus according to claim 12, wherein the engine includes sensor means (12, 16) for detecting the value of an operating parameter when the engine is operated, and said control unit (3) further includes means (201) for judging whether or not the operating parameter value detected by said sensor means satisfies a predetermined condition, said control means making the determination of said secondary air flow rate in the case where the operating parameter value satisfies said predetermined condition.

15. A malfunction monitoring apparatus according to claim 14, wherein a catalytic converter (7) for purifying an exhaust gas is disposed in said exhaust gas path and said secondary air supply device (8) supplies the secondary air to the upstream side (52) of an entrance to said catalytic converter.

16. A malfunction monitoring apparatus according to claim 15, wherein said control means (3) controls said secondary air supply means (8) and said switch valve means (11a, 11b) so that when the operating parameter value does not satisfy said predetermined condition (401), the secondary air is supplied to said exhaust gas path in the case where the engine is in a specified operating condition (411).

17. A malfunction monitoring apparatus according to claim 16, wherein said control means (3) further includes means for determining a fuel amount to be supplied to the engine on the basis of the value of said air flow rate (Qhw) measured by said air flow rate detecting device (2) when the secondary air is being supplied from said first secondary-air introducing path (32) into said exhaust gas path.

18. A malfunction monitoring apparatus according to claim 11, wherein in said diagnosis means (13), said predetermined allowable range is set to be larger than a predetermined value.

19. A malfunction monitoring apparatus according to claim 11, wherein in said diagnosis means (13), said predetermined allowable range is set to be between first and second predetermined values.

20. A malfunction monitoring apparatus according to claim 11, wherein the engine includes an engine speed sensor and a temperature sensor for detecting an intake air temperature, and the intake air flow rate determining means of said control means (3) includes means for determining said intake air flow rate on the basis of the detected internal pressure value of said intake manifold and the detected engine speed value and means for correcting the determined intake air flow rate in accordance with the detected intake air temperature (K).

21. A malfunction monitoring apparatus according to claim 20, wherein the intake air flow rate determining means of said control means (3) includes a memory in which a map indicating the value of an intake air flow rate corresponding to the value of the internal pressure of said intake manifold and the value of the engine speed is stored, and means for reading the intake air flow rate in reference to said map when the detected internal pressure value of said intake manifold and the detected engine speed value are given.

22. A malfunction monitoring apparatus according to claim 20, wherein the engine further includes means for detecting the pressure of an atmospheric air and the intake air flow rate determining means of said control means (3) further includes means for correcting the determined intake air flow rate in accordance with the detected atmospheric pressure.

23. A malfunction monitoring apparatus according to claim 22, wherein said means for detecting the atmospheric pressure takes in, the internal pressure of said intake manifold detected by said pressure detecting device (14) immediately before the engine is started, as the value of the atmospheric pressure.

24. A malfunction monitoring method for a secondary air supply device which supplies a secondary air to an exhaust gas path of an internal combustion engine provided with an air flow rate measuring device, comprising:

a step (204) of measuring by said air flow rate measuring device a first air flow rate (Qa) passing through an intake air path of the engine when the secondary air is not being supplied;

a step (208) of taking in, as the secondary air, a part of the air passing through said intake air path from a secondary air introducing path disposed in said intake air path on the downstream side of a measuring position of the air flow rate;

a step of measuring by said air flow rate measuring device a second air flow rate (Qb) when the secondary air is taken in from said secondary air introducing path;

a step of determining a secondary air flow rate (Qs) from a difference between said first and second air flow rates; and a step (215) of judging said secondary air supply device as being abnormal in the case where the determined secondary air flow rate is out of a predetermined allowable range.

25. A malfunction monitoring method according to claim 24, wherein said first air flow rate is measured twice before and after a period of time when said second air flow rate is measured, and said secondary air flow rate is determined from a difference between an average of both the measurement values for said first air flow rate and said second air flow rate.

26. A malfunction monitoring method according to claim 24, further comprising a step of detecting the value of an operating parameter when the engine is operated, and a step of judging whether or not the detected operating parameter value satisfies a predetermined condition, the determination of said secondary air flow rate being made in the case where the operating parameter value satisfies said predetermined condition.

27. A malfunction monitoring method according to claim 24, wherein said secondary air supply device is judged as being abnormal in the case where the determined secondary air flow rate is not larger than a predetermined lower limit (704).

28. A malfunction monitoring method according to claim 24, wherein said secondary air supply device is judged as being abnormal in the case where the determined secondary air flow rate is out of a range between a predetermined lower limit and a predetermined upper limit (704).

29. A malfunction monitoring method for a secondary air supply device which supplies a secondary air to an exhaust gas path of an internal combustion engine provided with an air flow rate measuring device, comprising:

a step (404) of detecting the internal pressure of an intake manifold of the engine;

a step (404) of determining an intake air flow rate (Qpm) of the engine on the basis of the detected value of the internal pressure of said manifold;

a step (405) of taking in, a part of the air through an intake air path of the engine, as the secondary air by said secondary air supply device from a secondary air introducing path disposed in said intake air path;

a step (407) of measuring by said air flow rate measuring device an air flow rate (Qhw) passing through the upstream side of said secondary air introducing path when the secondary air is taken in from said secondary air introducing path;

a step (407) of determining a secondary air flow rate (Qs) from a difference between the measured air flow rate (Qhw) and the determined intake air flow rate (Qpm); and a step (408) of judging said secondary air supply device as being abnormal in the case where the determined secondary air flow rate is out of a predetermined allowable range.

30. A malfunction monitoring method according to claim 29, further comprising a step of detecting the value of an operating parameter when the engine is operated, and a step of judging whether or not the detected operating parameter value satisfies a predetermined condition, the determination of said secondary air flow rate being made in the case where the operating parameter value satisfies said predetermined condition.

31. A malfunction monitoring method according to claim 29, wherein said secondary air supply device is judged as being abnormal in the case where the determined secondary air flow rate is not larger than a predetermined lower limit (704).

32. A malfunction monitoring method according to claim 29, wherein said secondary air supply device is judged as being abnormal in the case where the determined secondary air flow rate is out of a range between a predetermined lower limit and a predetermined upper limit (704).

33. A malfunction monitoring method according to claim 29, further comprising a step of detecting an engine speed of the engine and an intake air temperature, and a step of determining said intake air flow rate on the basis of the detected internal pressure value of said intake manifold and the detected engine speed value to correct the determined intake air flow rate in accordance with the detected intake air temperature (K).

34. A malfunction monitoring method according to claim 29, wherein in said step of determining the intake air flow rate, said intake air flow rate (Qpm) is determined referring to that map stored in a memory which indicates the value of an intake air flow rate corresponding to the value of the internal pressure of said intake manifold and the value of the engine speed.

35. A malfunction monitoring method according to claim 34, further comprising a step of taking in, the internal pressure of said intake manifold immediately before the engine is started, as the value of an atmospheric pressure, and a step of correcting the determined intake air flow rate in accordance with the detected atmospheric pressure.

* * * * *